United States Patent Office 2,971,846
Patented Feb. 14, 1961

2,971,846

PREPARATION OF CHEESE SLICES FOR PACKAGING

Donald M. Greer, Hinsdale, Ill., assignor to Armour and Company, Chicago, Ill., a corporation of Illinois No Drawing. Filed Mar. 15, 1951, Ser. No. 215,875

4 Claims. (Cl. 99—115)

This invention relates to the preparation of cheese slices for packaging. The invention is particularly useful in the treating of slices of natural cheese so that the slices may be packaged in face-to-face relation without tendency for the slices to adhere to any great extent to each other. The packaged slices may be readily separated from each other by the consumer without any danger of the slices tearing when they are being separated due to excessive coherence of the slices.

When natural cheese is sliced and the slices placed upon each other and packaged in face-to-face relation and in edge-overlapping or "shingle" relation, the slices tend to cohere with such tenacity that when an effort is made to separate the slices, tearing of portions of the slices occurs. The texture of the sliced material is such that the slices, when placed one upon the other, soon unite or cohere and ready separation of the slices intact is substantially impossible.

An object of the present invention is to provide a method for treating sliced natural cheese so that the treated slices may be packaged together and in face-to-face or edge-overlapping relation without tendency for the slices to cohere to an extent that prevents their being readily separated. Yet a further object is to provide sliced natural cheese which may be hard, semi-hard, or semi-soft, the surfaces of the slices being of such a character that when stacked in face-to-face or edge-overlapping relation they may be readily separated, and in intact condition. A still further object is to provide a method of treating natural cheese after the slicing thereof so as to enable the slices to be separated readily and without injury thereto after the treated slices have been packaged in face-to-face or edge-overlapping relation. Other specific objects and advantages will appear as the specification proceeds.

In one phase of the invention, a natural cheese body is sliced or otherwise shaped in sliced form and the resulting slices are subjected to heat radiation which is sufficient to melt the butterfat on the exterior surfaces of the cheese but without melting the cheese itself. The butterfat on the surfaces of the cheese is then chilled to set the butterfat as a layer on the outside surfaces of the cheese slice, and the cheese slices are then packaged in face-to-face relation. Natural cheese so sliced or formed in sliced shape by other means may be hard, semi-hard or semi-soft, as the same are catalogued or classed in the Federal Register. Examples of such cheese are Swiss cheese, Cheddar cheese, American cheese, hard Italian cheese (Romano), etc.

The heating may be accomplished by any heat source. A single slice may be exposed to a heat source of any type just long enough to melt the butterfat on the surface of the cheese and the heating is terminated before melting of the slice of cheese occurs. Thereafter, and preferably immediately thereafter, the cheese slice is chilled to set the butterfat on the exterior surface or surfaces of the cheese and then a number of such slices so treated may be stacked in face-to-face relation and packaged in the usual manner. The cheese slice may be supported upon a reticulated or screen support to enable both sides of the cheese slice to be heated at the same time. If desired, the cheese slice may be carried upon a nylon belt or other belt which freely passes infrared light rays and the cheese slice may be thus subjected to heat from infrared lamps placed both above and below such a conveyor. It will be understood that the method herein described is not limited to any particular apparatus and the heating of the exterior surfaces of the slice may be accomplished by the use of heating means over single or multiple slices either by supporting the heating means manually over slices or by the use of continuous equipment.

The chilling may be accomplished by passing the slices into a refrigerated zone and the chilling need be only to a degree that causes the butterfat to set upon the exterior surfaces of the cheese slice. For example, if the slices are heated to temperatures of 76 to 80° F. for the purpose of melting the butterfat on the exterior surfaces of the cheese slice, the subsequent chilling step will bring the temperatures well below these melting temperatures for the purpose of setting the butterfat in a thin layer on the exterior surfaces of the slice. I prefer to chill the cheese slices to temperatures in the general range of 50° down to 0° F.

Specific examples of the process may be set out as follows:

*Example 1*

A cake of natural Swiss cheese was sliced and the slices passed through a heated gas-fired oven rapidly to cause the exterior surfaces of each slice to be raised sufficiently to melt the butterfat thereon. At about 80–90° F., the butterfat melted upon the surfaces and before the slices themselves could melt, they were withdrawn from the oven. The slices were then placed within a refrigerator so as to bring the temperature quickly down to about 30° F. The chilling did not extend to the interior of the slices but was continued merely long enough to harden the layer of butterfat on the exterior surfaces of each slice. The treated slices were then stacked in face-to-face or edge-overlapping relation and packaged. When the package was opened for testing, it was found that the slices could be readily separated from each other without tendency of the slices to adhere tenaciously and break. Further, it was found that the surface heating and chilling seemed to strengthen the texture of the individual slices so that they were able to withstand more readily the tension placed upon the slices when they were being separated from the stack.

In the "shingle," or edge-overlapping arrangement of the slices, where there is ordinarily a tendency of the slices to tear upon being separated, the treated slices were removed readily and in intact condition.

*Example 2*

A cake of Cheddar cheese was sliced and the slices exposed to heat from an infrared electric coil to bring such surfaces to a temperature of about 76 to 80° F. The butterfat on the surfaces melted and formed a thin layer on the exterior surfaces. The heating source was removed before melting of the cheese slice occurred. The slice was then chilled to about 50° F. to set the butterfat layers, and the slices assembled in stack form. When the slices were later separated, they were found to have very little tendency to cling together and the separation of the slices intact by merely peeling them off by hand was readily accomplished.

*Example 3*

A cake of American cheese was sliced into thin slices and the slices heated in an electric oven merely long enough to bring the temperature of the surfaces of the cheese, held upon wire grids, to about 76 to 80° F. The brief heating did not produce any melting of the cheese body but did cause a thin film of butterfat to collect on the exterior surfaces of the slices. The slices were then passed quickly into a refrigerator and withdrawn after the temperature of the surfaces reached about 40° F. Thereafter the slices were packaged and did not tend to cohere when separation was later effected.

*Example 4*

Hard Italian cheese was sliced and the slices, supported upon a wire grid, were subjected to heat within a gas oven for a brief instant and withdrawn before melting of the cheese occurred. The heating, however, caused a layer of butterfat to collect as a thin liquid film over each exposed surface of each slice. The slices were then supported very briefly within a refrigerator maintained at a temperature of about 0° F. so that the butterfat film on the exterior surfaces of the slices hardened almost instantaneously. The chilled slices were then packaged in face-to-face relation and later were found to separate easily and without tendency to cohere or cling tenaciously to each other.

I have found that great latitude may be employed in the method of heating the slices, and that the time element is closely associated with the degree of temperature employed. The heating source may be very high and the oven, etc. to which the slices are exposed may be maintained at temperatures in excess of 100 or 200° F. However, because of the very brief period of exposure of the slices within such highly-heated area, no melting of the slice occurs, while at the same time effective melting of the butterfat on the surface of each slice is accomplished. Similarly, relatively low heating temperatures may be employed and the slices may be exposed thereto for relatively long periods to bring about the melting of the butterfat on the sliced surfaces without causing the melting of the slices themselves. Further, the character of the natural cheese body itself will cause a variation in the temperature and chilling conditions employed.

While in the foregoing specification, I have set forth specific steps in considerable detail for the purpose of illustrating embodiments of the invention, it will be understood that such details of procedure may be varied widely by those skilled in the art without departing from the spirit of my invention.

I claim:

1. A method of preparing for packaging a stack of non-adhering slices of cheese which normally constitutes an emulsion in which butterfat is in a discontinuous phase in a continuous phase of hydrated protein, said method comprising the steps of slicing the cheese and thereupon effecting superficial reversal of emulsion phase on the freshly cut surfaces of the slices by dehydrating such surfaces until an oil film develops thereon.

2. The method of claim 1 in which superficial dehydration and phase reversal are effected by thermal radiation of the cut slice surfaces, followed by the further step of assembling the irradiated slices in a stack in which the oil films on the cut surfaces intervene between the normal cheese emulsions of the slices, the said oil films rendering the slices readily separable and substantially mold-free during commercial handling.

3. As a new article of manufacture, a package comprising readily separable slices of cheese normally having an external continuous water phase and an internal discontinuous oil phase, the said slices having cut surfaces in contact, the said slices having only at their said cut surfaces their oil phase external to their water phase, whereby a continuous film of oil intervenes between the hydrated protein phase of successive cheese slices.

4. The article of claim 3 in which the cheese comprises a natural cheese.

References Cited in the file of this patent

UNITED STATES PATENTS

| | | |
|---|---|---|
| 1,445,786 | Meyers | Feb. 20, 1923 |
| 1,538,245 | Hulbert | May 19, 1925 |
| 1,981,986 | Bruhn | Nov. 27, 1934 |
| 2,361,775 | Kraft | Oct. 31, 1944 |
| 2,466,161 | Wiesman | Apr. 5, 1949 |